(12) United States Patent
Michel et al.

(10) Patent No.: US 9,409,545 B2
(45) Date of Patent: Aug. 9, 2016

(54) BELT RETRACTOR WITH A CHILD LOCK

(75) Inventors: Frederic Michel, Schwaebisch Gmuend (DE); Pawel Patyk, Czestochowa (PL)

(73) Assignee: TRW Automotive GmbH (DE)

( * ) Notice: Subject to any disclaimer, the term of this patent is extended or adjusted under 35 U.S.C. 154(b) by 198 days.

(21) Appl. No.: 14/115,637

(22) PCT Filed: May 7, 2012

(86) PCT No.: PCT/EP2012/001947
§ 371 (c)(1),
(2), (4) Date: Jan. 30, 2014

(87) PCT Pub. No.: WO2012/152424
PCT Pub. Date: Nov. 15, 2012

(65) Prior Publication Data
US 2014/0131501 A1      May 15, 2014

(30) Foreign Application Priority Data

May 12, 2011    (DE) .................. 10 2011 101 375

(51) Int. Cl.
*B60R 22/38*    (2006.01)
*B60R 22/415*   (2006.01)

(52) U.S. Cl.
CPC .............. *B60R 22/38* (2013.01); *B60R 22/415* (2013.01)

(58) Field of Classification Search
CPC ........................................ B60R 22/38
USPC .................. 242/382.5, 384.2, 385.2, 379
See application file for complete search history.

(56) References Cited

U.S. PATENT DOCUMENTS

| 4,193,566 | A  | * | 3/1980 | Inukai ..................... 242/382.5 |
| 4,729,524 | A  |   | 3/1988 | Befort et al. |
| 5,518,197 | A  |   | 5/1996 | Gray |
| 2001/0038054 | A1 |   | 11/2001 | Mori et al. |
| 2002/0079397 | A1 |   | 6/2002 | Snyder |
| 2003/0116668 | A1 | * | 6/2003 | Sumiyashiki ........... B60R 22/34 242/376 |
| 2004/0195422 | A1 |   | 10/2004 | Fleischmann et al. |
| 2005/0224623 | A1 | * | 10/2005 | Sumiyashiki .............. 242/384.2 |

FOREIGN PATENT DOCUMENTS

| EP | 0 523 936 | 1/1993 |
| EP | 1 209 047 | 5/2002 |
| EP | 1 394 004 | 3/2004 |
| EP | 1 462 323 | 9/2004 |

* cited by examiner

*Primary Examiner* — Sang Kim
(74) *Attorney, Agent, or Firm* — Tarolli, Sundheim, Covell & Tummino LLP

(57) ABSTRACT

A belt retractor (10) for a vehicle seat belt includes a frame (12) provided with plural blocking teeth (22), a belt reel (14) which is rotatably supported in the frame (12) and includes a blocking tooth system (24), and a control mechanism by which the belt reel (14) can be moved from a home position in which it can freely rotate in the frame (12) into a blocking position in which its blocking tooth system (24) engages in the blocking teeth (22) of the frame. The control mechanism includes a locking lever (80) adjustable between a release position and a locked position in which it locks rotation of the belt reel (14) relative to the control mechanism so that the belt reel (14) can be moved into the blocking position by a tensile force acting in the webbing.

20 Claims, 6 Drawing Sheets

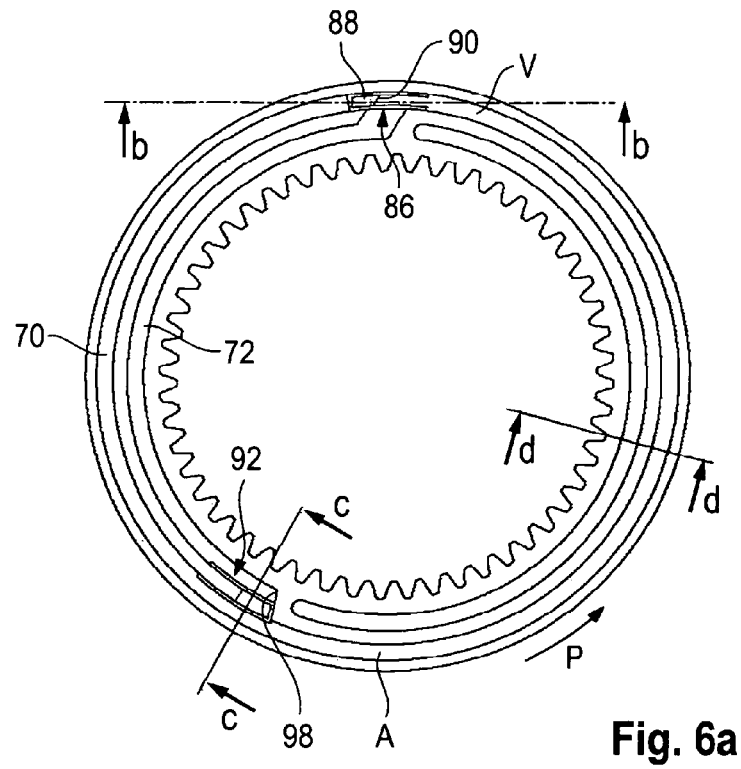
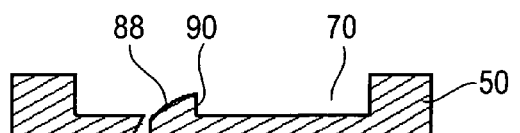
Fig. 6a
Fig. 6b
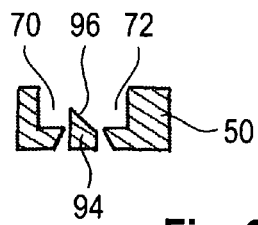
Fig. 6c
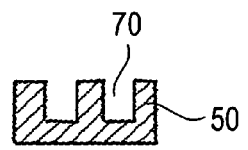
Fig. 6d

BELT RETRACTOR WITH A CHILD LOCK

RELATED APPLICATIONS

This application corresponds to PCT/EP2012/001947, filed May 7, 2012, which claims the benefit of German Application No. 10 2011 101 375.3, filed May 12, 2011, the subject matter, of which are incorporated herein by reference in their entirety.

BACKGROUND OF THE INVENTION

The invention relates to a belt retractor for a vehicle seat belt comprising a frame provided with plural blocking teeth, a belt reel being pivoted in the frame and having a blocking tooth system, and comprising a control mechanism by which the belt reel can be moved from a home position in which it can freely rotate in the frame to a blocking position in which its blocking tooth system engages in the blocking teeth of the frame.

In this type of belt retractor the belt reel is displaced, when it is to be locked, relative to the frame so that the tooth system arranged at the same engages in the blocking teeth provided at the frame. For this purpose, a control mechanism is provided which ensures that the tooth system of the belt reel is controlled to take the correct position in the blocking teeth of the frame so that engagement of the tooth system in the blocking teeth is produced before high loads are acting on the belt reel.

The control mechanism includes the control lever usually provided with an internal tooth system in which a control pawl arranged at an end face of the belt reel can engage. The control pawl can be released in a way either sensitive to the belt webbing or sensitive to the vehicle so that it engages in the internal tooth system and fixedly couples the belt reel to the control lever. When in this state a tensile force is exerted by the webbing on the belt reel, this results in the fact that the control lever together with the belt reel pivots about the pivot point at which the control lever is arranged at the frame and the belt reel is controlled to engage in the locking teeth at the frame. The arrangement of the teeth of the internal tooth system at the control lever relative to the blocking teeth ensures that the belt reel is basically guided with its tooth system in the correct position into the blocking teeth so that the tooth crests of the tooth system of the belt reel are prevented from impacting on the tooth crests of the blocking teeth.

It has not been known so far to provide a belt retractor of this type with a child lock as it is called, viz. a possibility of locking the belt reel so that the webbing can be wound onto the same but cannot be unwound from the same any more. This function is useful, for instance, for fixing child' safety seats on a vehicle seat. Child lock systems are basically generally known, to be sure (cf. e.g. EP 1 209 047 A1), but they are used only with belt retractors in which the belt reel is received in the frame of the belt retractor with a fixed axis of rotation.

SUMMARY OF THE INVENTION

It is the object of the invention to further develop a belt retractor of the type mentioned in the beginning to the effect that despite the displacement of the belt reel required for blocking a child lock function can be realized.

For achieving this object it is provided in a belt retractor of the type mentioned in the beginning that the control mechanism includes a locking lever adjustable between a release position and a locked position in which it locks rotation of the belt reel relative to the control mechanism so that the belt reel can be moved into the blocked position by a tensile force acting in the webbing. The invention is based on the principal idea to integrate the locking lever required for selectively locking the webbing in the control mechanism so that the latter especially co-moves when the belt reel is moved from its home position into the blocked position for the purpose of blocking.

It is preferably provided that the control mechanism includes a control lever and that the locking lever is pivoted to the control lever. This ensures that when displacing the webbing from the home position into the locked position no relative movement occurs between the belt reel and the locking lever.

According to an embodiment it is provided that the control mechanism includes a control disk coupled to the belt reel and interacting with the locking lever. By such control disk the control lever can be changed between the release position and the locked position in a technically simple manner and with little space required.

It is preferably provided that the control disk is coupled to the belt reel by means of a reduction gear unit. This enables the child lock function to be turned on or off in response to the rotation of the belt reel, especially to be turned on when the entire webbing has been drawn off the belt reel.

The reduction gear unit may especially include a stepped gearwheel driven by a pinion that is coupled to the belt reel and engages in an internal tooth system provided at the control disk. This configuration ensures with little space required that the control disk performs less than one complete turn, when the belt reel performs plural turns between a state of a completely wound-up webbing and a state of a completely drawn off webbing.

In accordance with a preferred embodiment, it is provided that the control disk has two concentric guide grooves with which a guide element of the locking lever can interact, wherein one of the guide grooves defines the release position of the locking lever and the other defines the locked position. This configuration, too, assists a compact structure of the mechanism by which the child lock function can be realized.

Preferably a change-over mechanism is provided which can transfer the guide element of the locking lever from the one guide groove to the other. The change-over mechanism permits changing the locking lever in response to the direction of rotation of the control disk and thus also the belt reel back and forth between the locking guide groove and the release guide groove so that at the desired point in time the child lock function is turned on or off.

In this context, it is especially provided that the change-over mechanism includes an activating element associated with the release guide groove and can transfer the guide element from the release guide groove into the locking guide groove, when the control disk overruns the guide element in a direction corresponding to winding up the webbing. This enables the child lock function to be activated at the desired point in time.

It can further be provided that the change-over mechanism has a deactivating element which transfers the guide element from the locking guide groove into the release guide groove, when the guide element has reached the end of the locking guide groove. In this way the child lock function can be turned off with little effort when, for example, almost the entire webbing is wound onto the belt reel again.

In accordance with an embodiment, it can be provided that the activating and/or deactivating element includes an elastically resilient lug at the control disk. In this way it can be achieved with lithe effort that the activating and/or deactivating element can be overrun by the guide element in the one direction of rotation of the belt reel and thus the control disk but is effective in the other direction.

As an alternative, it can be provided that the guide element of the locking lever is elastically deflectable in parallel to the pivot axis of the locking lever. This, too, permits with little effort that the guide element can overrun the change-over mechanism in the one direction but is deflected in the other direction in the desired manner.

According to a preferred embodiment, it is provided that the guide element is arranged at a guide arm that is elastically connected to the locking lever. This enables the locking lever to slip over the blocking teeth of the belt reel during wind-up of the webbing elastically in the form of a ratchet but to reliably interlock in the other direction.

BRIEF DESCRIPTION OF THE DRAWINGS

Hereinafter the invention shall be described by way of different embodiments shown in the enclosed drawings in which:

FIG. 6 is a side view of the control disk of FIG. 5 as well as different sectional views.

DESCRIPTION OF EMBODIMENTS

Figure 1:
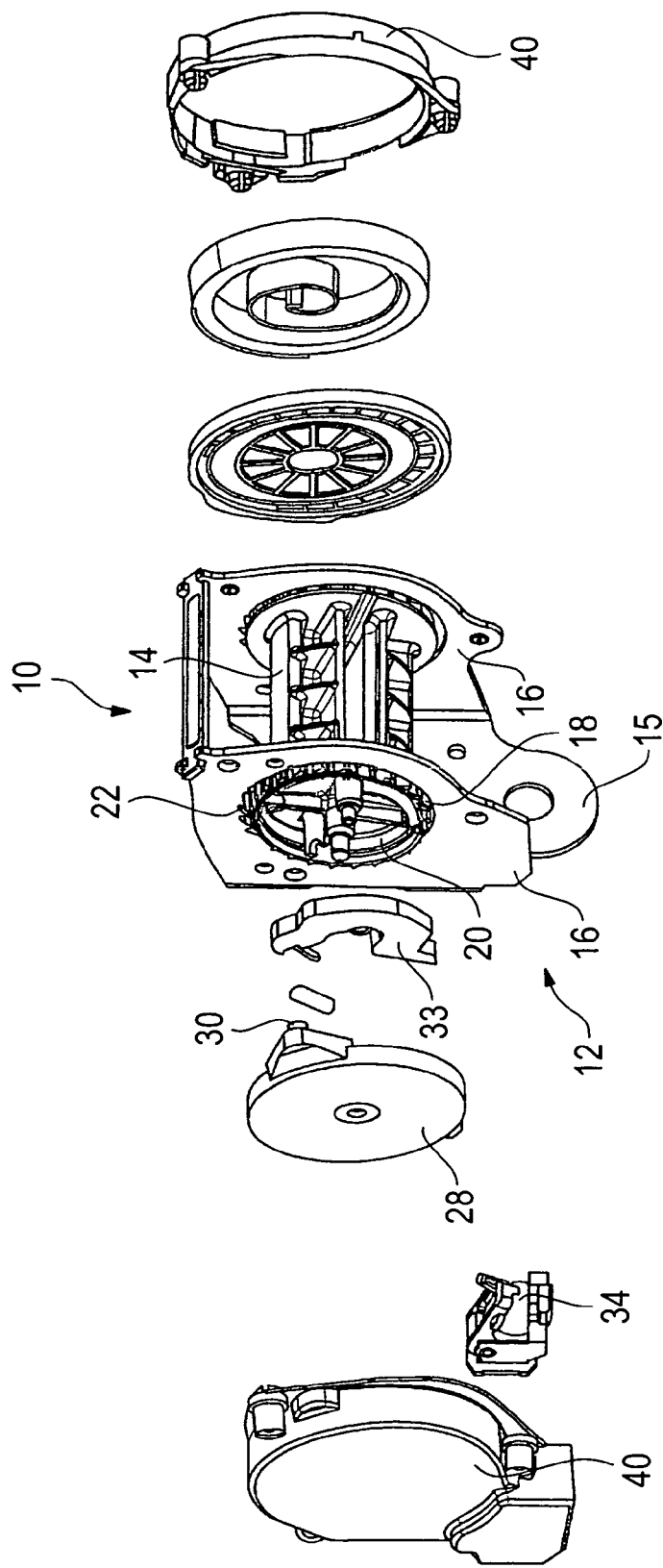
FIG. 1 schematically shows a belt retractor in an exploded view.
Figure 2:
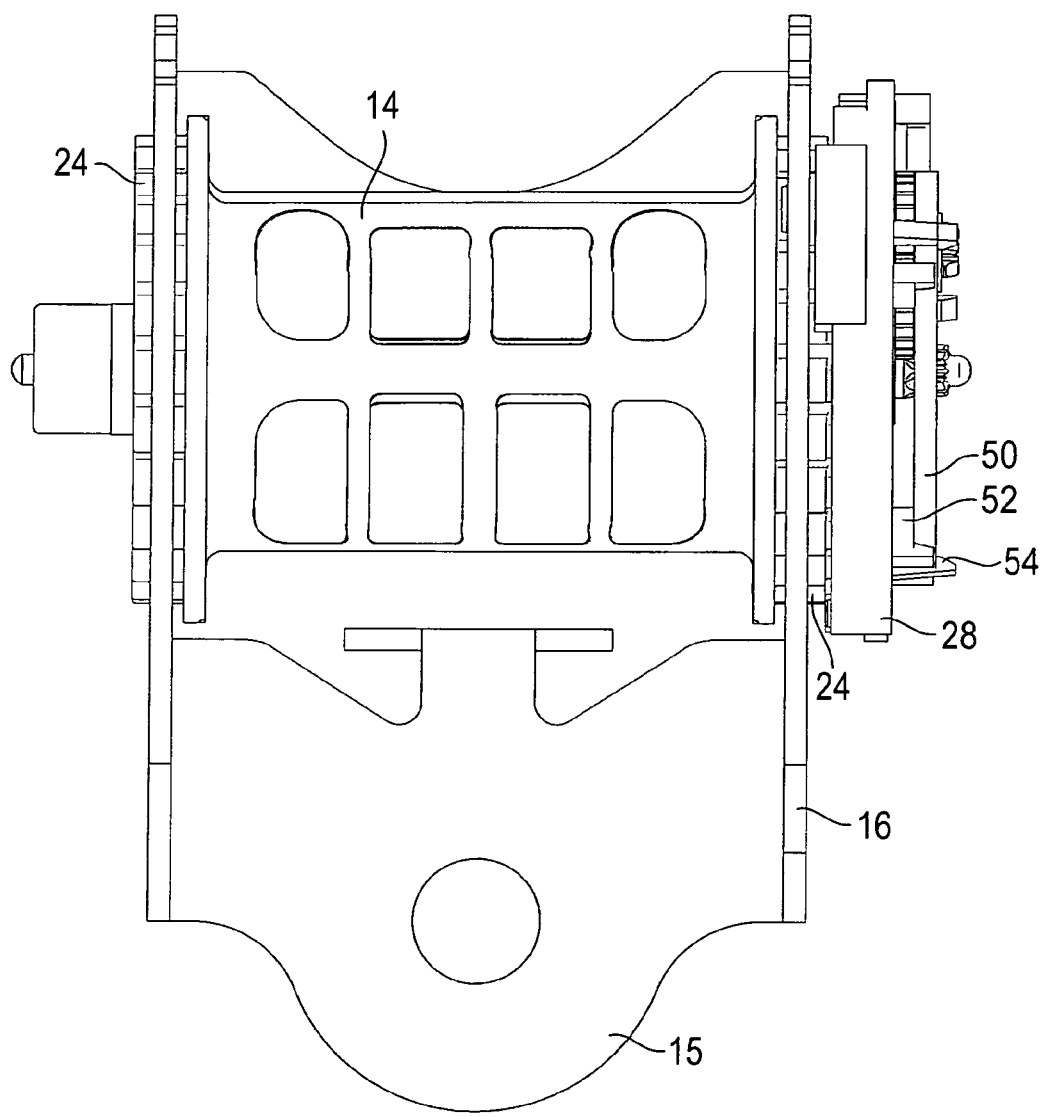
FIG. 2 shows a belt retractor according to the invention in a front view.
Figure 3:
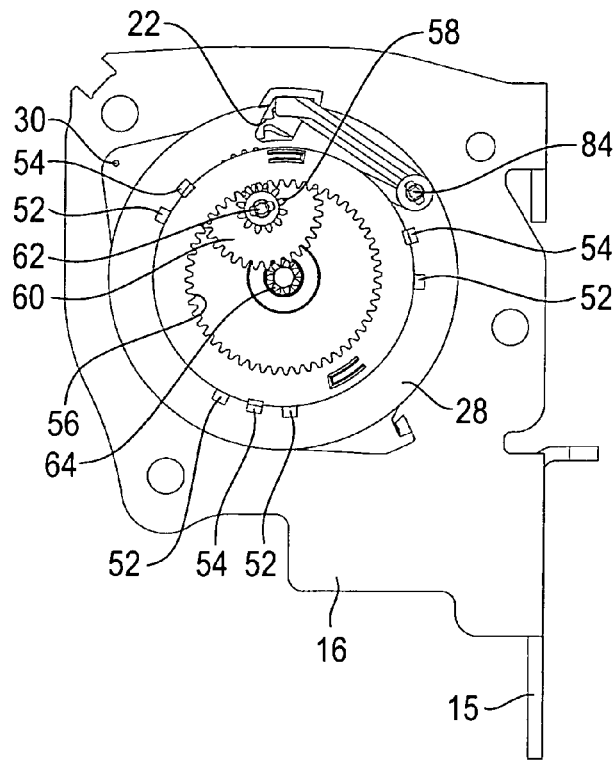
FIG. 3 shows a belt retractor according to the invention in a schematic side view.

In FIGS. 1 to 3 a belt retractor 10 is shown including a frame 12 and a belt reel 14. The frame 12 comprises a rear member 15 and two side members 16; each of the two side members 16 being provided with an aperture 18 within which a flange 20 provided at each axial end of the belt reel is accommodated. The rim of each aperture 18 is provided with plural blocking teeth 22 the geometry and partition of which is adjusted to a blocking tooth system 24 formed at each flange of the belt reel 14.

Figure 4:
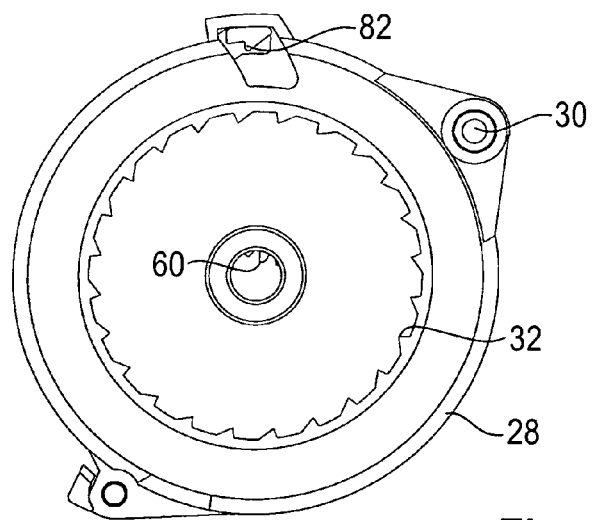
FIG. 4 is a detailed view of the control lever with a locking lever arranged thereon.
Figure 5A:
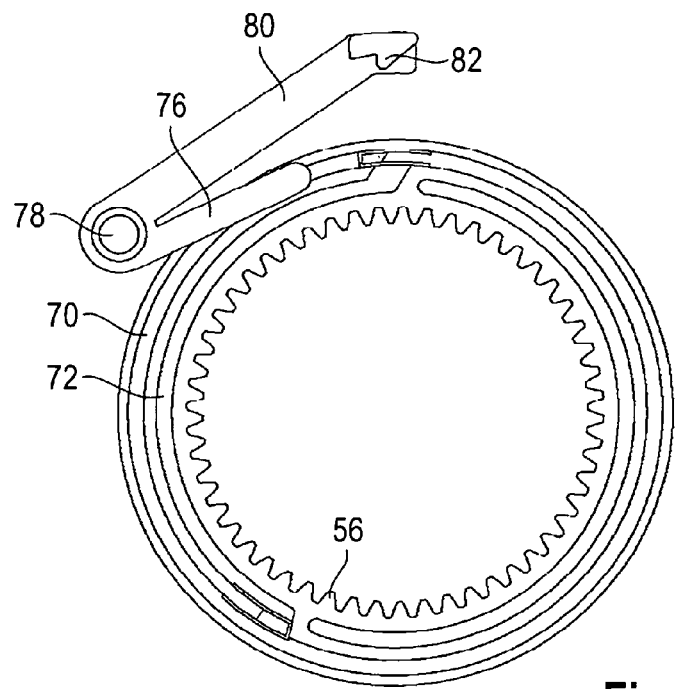
FIG. 5 is a side view of a first configuration of a control disk with the locking lever engaging in the same as well as two views of the locking lever.
Figure 5B:
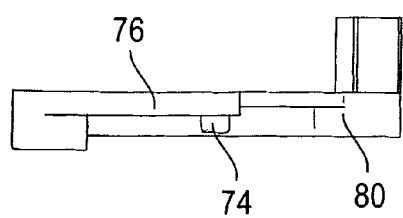
Figure 5C:
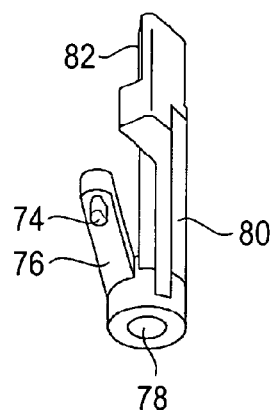

At one of the two side members 16 of the frame 12 of the belt retractor 10 a control lever 28 is arranged which is designed in the form of a cap and is disposed with a pivot pin 30 to be restrictedly pivoting at the respective side member 16 of the frame 12. The control lever 28 is provided on its inside with an internal tooth system 32 (cf. FIG. 4) which is arranged for a webbing-sensitive blocking of the belt reel known per se. A control pawl 33 adapted to be released in a webbing-sensitive manner can engage in the internal tooth system 32.

For vehicle-sensitive blocking a sensor 34 is provided which is adapted to interact with a locking tooth system not shown here such that the rotation of the belt reel is prevented and the belt reel swivels into the blocking tooth system. This is basically known so that this will not be explained here in detail.

As long as the control pawl 33 is not activated and the sensor is not deflected, resp., the belt reel can freely rotate inside the apertures 18 of the side members 16 of the frame 12. The belt reel is guided inside the housing shells 40. When the control pawl 33 is activated in a webbing-sensitive manner, it engages in the internal tooth system 32. When then tension is exerted on the belt webbing, the belt reel is pivoted about the pivot pin 30 thereof along with the control lever 28. Thus the locking tooth system 24 engages in the locking teeth 22 of the frame so that the belt reel 14 is reliably blocked relative to the frame 12. In the case of vehicle-sensitive locking, the sensor lever engages in the locking tooth system via an intermediate lever not shown. When pulling the webbing the belt reel is pivoted along with the control lever 28 about the pivot pin 30 thereof. Thus the blocking tooth system 24 engages in the blocking teeth 22 of the frame.

The belt retractor is provided with a child lock function realized on the side of the control lever 28. The structure of this mechanism and its function will be illustrated hereinafter by way of FIGS. 2 to 6.

A control disk 50 which is rotatable relative to the control lever 28 is arranged at the control lever 28. For supporting the control disk 50 plural counter-bearings 52 and detent hooks 54 are provided that ensure, distributed in the circumferential direction, a circular guide path for the control disk 50 as well as fixing in the axial direction.

The control disk 50 is designed as ring and on its inner periphery includes an internal tooth system 56 in which a smaller gearwheel 58 engages which is connected to co-rotate with a larger gearwheel 60. The stepped gearwheel formed by the two gearwheels 58, 60 is rotatably accommodated on a bearing pin 62 that is fixedly formed at the control lever 28. The larger gearwheel 60 meshes in a pinion 64 connected to co-rotate with the belt reel 14. Thus the control disk 50 rotates in opposite direction to the belt reel 14 and at a strongly reduced speed. The reduction is especially so that the control disk 50 performs less than one turn, when the belt reel is transferred from a state of completely wound up webbing to a state of completely drawn-off webbing. "Completely wound up" and "completely drawn off" in this case relates to the mounted state of the belt retractor in a vehicle.

The control disk 50 is provided with two guide grooves, viz. a release guide groove 70 and a locking guide groove 72. The two guide grooves 70, 72 are concentrically arranged, the release guide groove 70 being located outside the locking guide groove 72. The locking guide groove 72 extends over an angular area of somewhat less than 180° and at its both ends is transformed into the release guide groove 70. The latter extends over a larger angular area than the locking guide groove 72, wherein it is designed to be circumferential in the shown embodiment.

A guide element 74 in the form of a pin at a guide arm 76 which is connected to a locking lever 80 via a bearing portion 78 interacts with the two guide grooves 70, 72. The guide arm 76 is elastically deformable relative to the control lever 80 in the sense that the distance between the locking tooth 82 and the guide element 74 can be varied, especially by elastic material deformation of the guide arm 76.

At the end of the locking lever 80 facing away from the bearing portion 78 a locking tooth 82 adapted to interact with the blocking tooth system 24 of the belt reel 14 is arranged. The bearing portion 78 of the locking lever 80 is arranged on a bearing pin 84 fixedly mounted on the control lever 28.

Generally speaking, the child lock function is activated in that the locking lever 80 is changed inwardly in the radial direction so that starting from the release position shown in the Figures it adopts a locked position in which the locking tooth 82 interacts with the locking tooth system 24 of the belt reel 14. In the locked position the locking lever 80 prevents the belt reel from being rotated in the unwinding direction of the webbing so that, when tension is exerted on the webbing in this state, the belt reel is pivoted together with the control lever about the pivot pin 30 until the belt reel is in the blocking position. If, on the other hand, the belt reel is rotated in the winding direction, the locking tooth system 24 slips beneath the locking tooth 82 in the way of a ratchet effect, as the locking lever 80 is elastically deformable relative to the guide element 74. The locking lever 80 is independent of the sensor 34 and the sensor lever thereof and the intermediate lever interacting therewith. The locking lever is also independent of the control pawl 33.

Change-over between the locked position and the release position is effectuated by means of a change-over mechanism by which the guide element 74 can be transferred from the release guide groove 70 into the locking guide groove 72, and vice versa. For this purpose, the change-over mechanism includes an activating element 86 in this case in the form of an elastically resilient lug that is arranged in the release guide groove 70 in the area of transition to the locking guide groove 72. The activating element 86 is beveled in two directions: on the one hand, the surface 88 of the activating element on which the guide element 74 impacts when the control disk 50 rotates upon unwinding the webbing, rises obliquely from the bottom of the release guide groove 70 to the top so that the activating element 86 elastically backs away downwardly (related to the representation in FIG. 6b), when the guide element 74 overruns the activating element 86. On the other hand, the opposite surface 90 on which the guide element 74 impacts when the control disk 50 is rotated upon winding up the webbing is inclined with respect to the adjusting direction so that the guide element 74 is inwardly deflected in the radial direction, when the activating element 86 impacts on the guide element 74.

The change-over mechanism also includes a deactivating element 92 which, on the one hand, comprises an elastically deformable deactivating lug 94 the side face 96 thereof facing the locking guide groove 72 is inclined. On the other hand, the deactivating element 92 has an inclined deflecting wall 98 arranged at the end of the locking guide groove 72 and leading outwardly to the release guide groove 70. Both the activating element 86 and the deactivating lug 94 are formed integrally with the control disk 50 in that they are formed with the control disk 50 as freely arranged tabs.

In the home position, i.e. when the webbing is completely wound on the belt reel 14, the control disk 50 is in a position in which the guide element 74 is provided approximately in the area of point A of FIG. 6a. When the webbing is then drawn off the belt reel, the control disk 50 turns in the direction of arrow P of FIG. 6a so that the guide element 74 first slips past the deactivating element 92. Due to the configuration of the deactivating lug 94 the guide element 74 follows the release guide groove 70, because inadvertent passing inwardly into the locking guide groove 72 is prevented. When the webbing is further drawn off, the control disk 50 is further rotated so that the guide element 74 slips over the activating element 86; due to the inclined surface 88 the activating element 86 is pressed out of the guide groove 70. When the webbing is completely drawn off, the control disk 50 finally takes a position at which the guide element 74 is provided approximately at the point V of FIG. 6a.

When the webbing is then rewound onto the belt reel, the control disk 50 rotates in the opposite direction, until the guide element 74 impacts on the surface 90 of the activating element 86. Since this surface is inclined, the guide element is adjusted radially inwardly, whereby the control lever 80 (related to FIG. 5a, for example) is pivoted radially inwardly into the locked position. In this position the locking tooth 82 interacts with the blocking tooth system 24 such that the belt reel can be further rotated in the winding direction; the teeth of the blocking tooth system 24 of the belt reel 14 force the locking tooth 82 inclined on the respective side outwardly while the guide element 74 is further retained in the locking guide groove 72. In this way the webbing can be wound until, for example, a child's safety seat is tightly fixed. Webbing draw-off is not possible.

When the child lock function is to be turned off again, the webbing has to be further wound onto the belt reel, for instance after releasing the plug-in tongue and removing the child's safety seat. As soon as the guide element 74 impacts on the deflecting surface 98 at the end of the locking guide groove 72, it is outwardly adjusted in the radial direction, wherein it overruns the deactivating lug 94 and gets into the release guide groove 70. Thus the locking lever 80 is pivoted outwardly into the release position again so that the belt reel can be rotated unhindered in each direction.

Figure 7A:
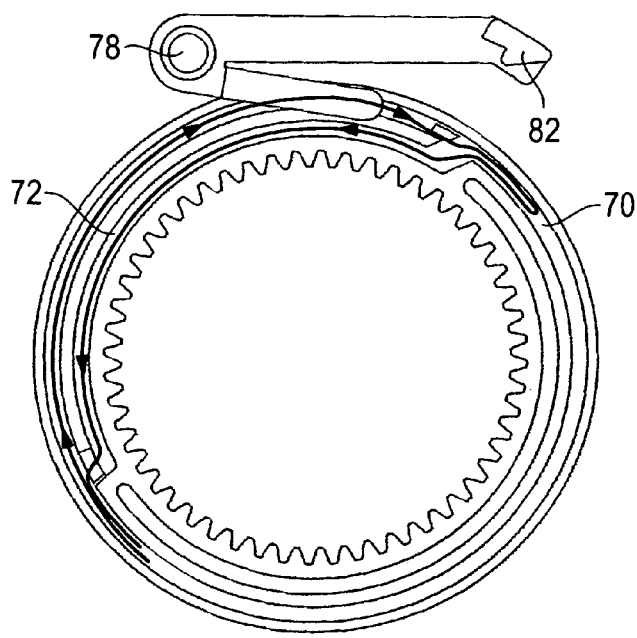
FIG. 7 shows in a view corresponding to that of FIG. 5 a control disk according to a second embodiment as well as two views of the locking lever.
Figure 7B:
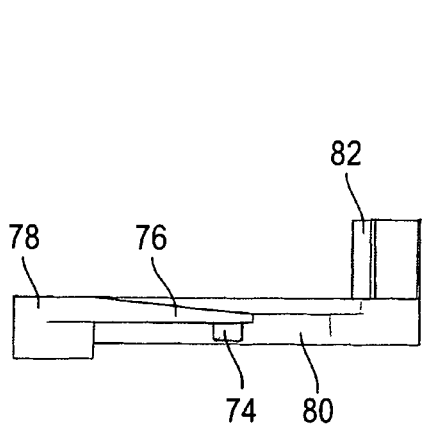
Figure 7C:
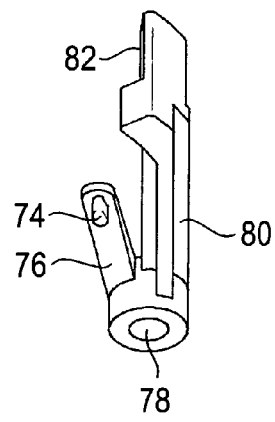

In FIG. 7 an alternative embodiment of the control disk 50 is shown which differs from the control disk shown in FIG. 6 as regards the activating element and the deactivating element. In contrast to the first embodiment, in the second embodiment the activating element 86 and the deactivating element 92 are formed to be stationary but inclined in the same way. The elasticity required for the guide element 74 to be capable of overrunning the activating element 86 and the deactivating element 92 is obtained in that the guide arm 76 is elastically deformable in the axial direction related to the bearing portion 78. This enables the guide element 74 to back away in the axial direction.

For the purpose of clarification, in FIG. 7a the path of the guide element 74 in the release guide groove 70 and the locking guide groove 72 is plotted when the belt retractor is transferred from a normal operating state via a child lock mode into the normal state again. The guide element also takes this path in the case of the control disk according to the first embodiment.

The invention claimed is:

1. A belt retractor (10) for a vehicle seat belt comprising a frame (12) provided with plural blocking teeth (22), a belt reel (14) that is rotatably supported in the frame (12) and has a blocking tooth system (24), and comprising a control mechanism which supports the belt reel (14) for movement relative to the frame from a home position in which the belt reel freely rotates in the frame (12) into a blocking position in which the blocking tooth system (24) engages in the blocking teeth (22) of the frame, wherein the control mechanism includes a locking lever (80) adjustable between a release position and a locked position in which the locking lever locks rotation of the belt reel (14) relative to the control mechanism so that the belt reel (14) moves into the blocking position, the locking lever being mounted for movement with the belt reel and the control mechanism relative to the frame when the belt reel moves between the home position and the blocking position.

2. The belt retractor according to claim 1, wherein the control mechanism includes a control lever (28) and that the locking lever (80) is pivoted on the control lever (28).

3. The belt retractor according to claim 1, wherein the control mechanism includes a control disk (50) coupled to the belt reel (14) and interacting with the locking lever (80).

4. The belt retractor according to claim 3, wherein the control disk (50) is coupled to the belt reel (14) by means of a reduction gear unit (56, 58, 60, 64).

5. The belt retractor according to claim 4, wherein the reduction gear unit comprises a stepped gearwheel (58, 60)

driven by a pinion (64) coupled to the belt reel (14) and engaging in an internal tooth system (56) provided at the control disk (50).

6. The belt retractor according to claim 3, wherein the control disk (50) has two concentric guide grooves (70, 72) with which a guide element (74) of the locking lever (80) can interact, one of the guide grooves defining the release position of the locking lever and the other defining the locked position.

7. The belt retractor according to claim 6, wherein a change-over mechanism (86, 92) is provided which is adapted to transfer the guide element (74) of the locking lever (80) from the one guide groove to the other.

8. The belt retractor according to claim 7, wherein the change-over mechanism includes an activating element (86) associated with the release guide groove (70) and being adapted to transfer the guide element (74) from the release guide groove (70) into the locking guide groove (72), when the control disk (50) overruns the guide element (74) in a direction corresponding to wind-up of the webbing.

9. The belt retractor according to claim 8, wherein the activating element comprises an elastically resilient lug at the control disk (50).

10. The belt retractor according to claim 8, wherein the guide element (74) of the locking lever (80) can be elastically deflected in parallel to the pivot axis of the locking lever (80).

11. The belt retractor according to claim 7, wherein the change-over mechanism includes a deactivating element (92) which transfers the guide element (74) from the locking guide groove (72) into the release guide groove (70) when the guide element (74) has reached the end of the locking guide groove (72).

12. The belt retractor according to claim 11, wherein the deactivating element comprises an elastically resilient lug at the control disk.

13. The belt retractor according to claim 6, wherein the guide element (74) is arranged at a guide arm (76) which is elastically connected to the locking lever (80).

14. The belt retractor according to claim 1, wherein the blocking teeth are stationary relative to the frame.

15. The belt retractor according to claim 1, wherein the blocking tooth system is fixed for rotation with the belt reel relative to the frame.

16. A belt retractor for a vehicle seat belt comprising:
a frame having a plurality of blocking teeth;
a belt reel onto which belt webbing is wound, the belt reel being rotatable relative to the frame;
a blocking tooth system fixed for rotation with the belt reel relative to the frame, the blocking tooth system engaging the blocking teeth of the frame to prevent relative rotation of the belt reel relative to the frame;
a control mechanism supporting the belt reel for rotation relative to the frame and configured to support the belt reel for movement relative to the frame from a home position where the belt reel rotates relative to the frame to a blocking position where the blocking tooth system engages the blocking teeth, the control mechanism including a locking lever pivotable between a release position that allows rotation of the belt reel relative to the frame and a locked position that prevents rotation of the belt reel relative to the control mechanism such that the belt reel moves to the blocking position, the locking lever being mounted for movement with the belt reel and the control mechanism relative to the frame when the belt reel moves between the home position and the blocking position.

17. The belt retractor according to claim 16, wherein the control mechanism includes a control disk that interacts with the locking lever and is coupled to the belt reel by a reduction gear unit.

18. The belt retractor according to claim 17, wherein the locking lever has a guide element that interacts with concentric guide grooves provided on the control disk, a first groove of the guide grooves defining the release position of the locking lever and a second groove of the guide grooves defining the locked position of the locking lever.

19. The belt retractor according to claim 18, wherein the control disk is provided with a change-over mechanism that transfers the guide element between the first groove and the second groove, the change-over mechanism including an activating element associated with the first groove and being adapted to transfer the guide element from the first groove to the second groove when the control disk overruns the guide element in a webbing wind-up direction.

20. The belt retractor according to claim 19, wherein the change-over mechanism includes a deactivating element that transfers the guide element from the second groove to the first groove when the guide element reaches an end of the second groove.

* * * * *